(12) United States Patent
Forestier et al.

(10) Patent No.: US 11,560,921 B2
(45) Date of Patent: Jan. 24, 2023

(54) SEALING APPARATUS FOR SEALING THE BALL JOINT OF A KINGPIN

(71) Applicant: LIEBHERR MINING EQUIPMENT COLMAR SAS, Colmar (FR)

(72) Inventors: Cédric Forestier, Colmar (FR); Kai Kugelstadt, Lahr (DE)

(73) Assignee: LIEBHERR MINING EQUIPMENT COLMAR SAS, Colmar (FR)

( * ) Notice: Subject to any disclaimer, the term of this patent is extended or adjusted under 35 U.S.C. 154(b) by 659 days.

(21) Appl. No.: 16/089,299

(22) PCT Filed: Mar. 29, 2017

(86) PCT No.: PCT/EP2017/000386
§ 371 (c)(1),
(2) Date: Sep. 27, 2018

(87) PCT Pub. No.: WO2017/167445
PCT Pub. Date: Oct. 5, 2017

(65) Prior Publication Data
US 2020/0300291 A1   Sep. 24, 2020

(30) Foreign Application Priority Data
Mar. 29, 2016 (DE) ..................... 10 2016 003 781.4

(51) Int. Cl.
*F16C 11/06* (2006.01)
*B60G 7/00* (2006.01)

(52) U.S. Cl.
CPC .......... *F16C 11/0676* (2013.01); *B60G 7/005* (2013.01); *F16C 11/0666* (2013.01);
(Continued)

(58) Field of Classification Search
CPC .............. B60G 7/005; B60G 2204/416; F16C 11/0623; F16C 11/0633; F16C 11/0666;
(Continued)

(56) References Cited

U.S. PATENT DOCUMENTS 2,510,362 A * 6/1950 Anderson ............... F16D 3/845
464/175
3,529,839 A * 9/1970 Greiner ................... F16J 15/38
277/387
(Continued)

FOREIGN PATENT DOCUMENTS

DE      1863433 U     12/1962
DE      2541381 A1 *  9/1975
(Continued)

OTHER PUBLICATIONS

ISA European Patent Office, International Search Report Issued in Application No. PCT/EP2017/000386, dated Jun. 8, 2017, WIPO, 4 pages.

*Primary Examiner* — Josh Skroupa
*Assistant Examiner* — Kevin J Baynes
(74) *Attorney, Agent, or Firm* — McCoy Russell LLP

(57) ABSTRACT

The invention relates to a sealing apparatus for sealing the ball joint of a kingpin comprising at least one holding ring and at least one seal ring, wherein the seal ring is provided at least partially within a groove of the holding ring, and wherein the groove is provided in a radially inwardly disposed region of the holding ring.

14 Claims, 3 Drawing Sheets

(52) U.S. Cl.
CPC .... *B60G 2204/416* (2013.01); *F16C 11/0623* (2013.01); *F16C 2326/05* (2013.01); *Y10T 403/32729* (2015.01)

(58) Field of Classification Search
CPC .............. F16C 11/0676; F16C 2326/05; F16C 11/0628; F16C 11/0671; Y10T 403/32713; Y10T 403/32729; F16J 15/32; F16J 15/3204; F16J 15/3232
USPC ........................................................ 403/134
See application file for complete search history.

(56) References Cited

U.S. PATENT DOCUMENTS

| | | | | |
|---|---|---|---|---|
| 3,806,158 | A * | 4/1974 | Casey | F16C 11/0614 403/77 |
| 4,099,798 | A * | 7/1978 | Steinmetz | B23Q 11/0875 285/302 |
| 4,132,421 | A * | 1/1979 | Corsi | F16J 15/328 277/565 |
| 5,318,480 | A * | 6/1994 | Essi | F16J 3/048 277/636 |
| 5,678,947 | A * | 10/1997 | Urbach | F16C 11/0633 277/507 |
| 5,722,699 | A * | 3/1998 | Brancher | E03F 3/04 285/142.1 |
| 6,089,574 | A * | 7/2000 | Sadr | F16D 3/845 277/635 |
| 6,276,702 | B1 * | 8/2001 | Turek | B60G 3/20 280/93.511 |
| 6,866,271 | B2 * | 3/2005 | MacDonald | F16J 15/3276 277/353 |
| 6,962,351 | B2 * | 11/2005 | De Freitas | F16C 11/0671 277/637 |
| 7,192,214 | B2 * | 3/2007 | Schonhoff | F16C 11/0671 403/122 |
| 7,654,766 | B2 * | 2/2010 | Zuge | B60G 7/005 403/31 |
| 8,714,861 | B2 * | 5/2014 | Bernhardt | F16C 11/0671 403/134 |
| 9,068,591 | B2 * | 6/2015 | Bernhardt | F16C 11/0671 |
| 9,416,518 | B2 * | 8/2016 | Ditzler | F16C 11/069 |
| 10,288,173 | B2 * | 5/2019 | Chapagain | F16C 11/06 |
| 2006/0182491 | A1 * | 8/2006 | Bernhardt | F16C 11/0671 403/134 |
| 2008/0019766 | A1 * | 1/2008 | Flaim | F16C 11/0676 403/122 |
| 2008/0056811 | A1 * | 3/2008 | Urbach | F16C 11/0671 403/122 |
| 2016/0097455 | A1 * | 4/2016 | Chapagain | F16C 11/0676 277/500 |
| 2016/0273578 | A1 * | 9/2016 | Yanagi | F16J 3/041 |

FOREIGN PATENT DOCUMENTS

| | | |
|---|---|---|
| DE | 10139564 A1 | 2/2003 |
| DE | 102008036914 A1 | 2/2010 |
| EP | 0024749 A1 | 3/1981 |

* cited by examiner

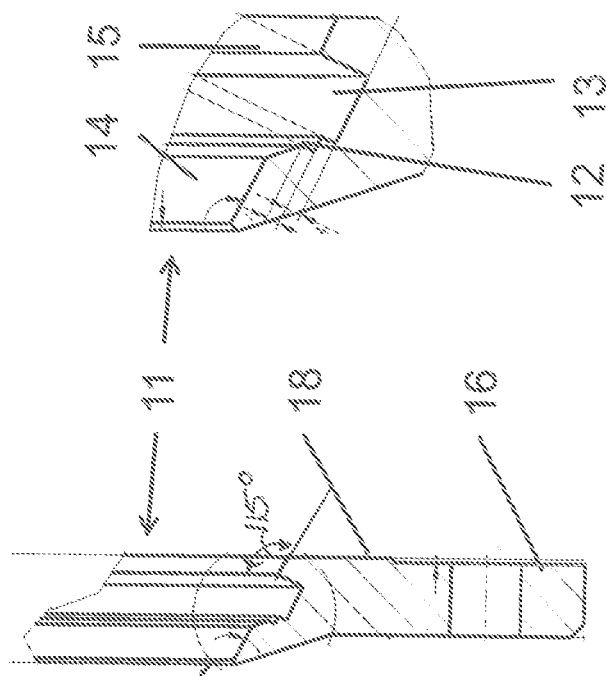
Fig. 2C  Fig. 2D
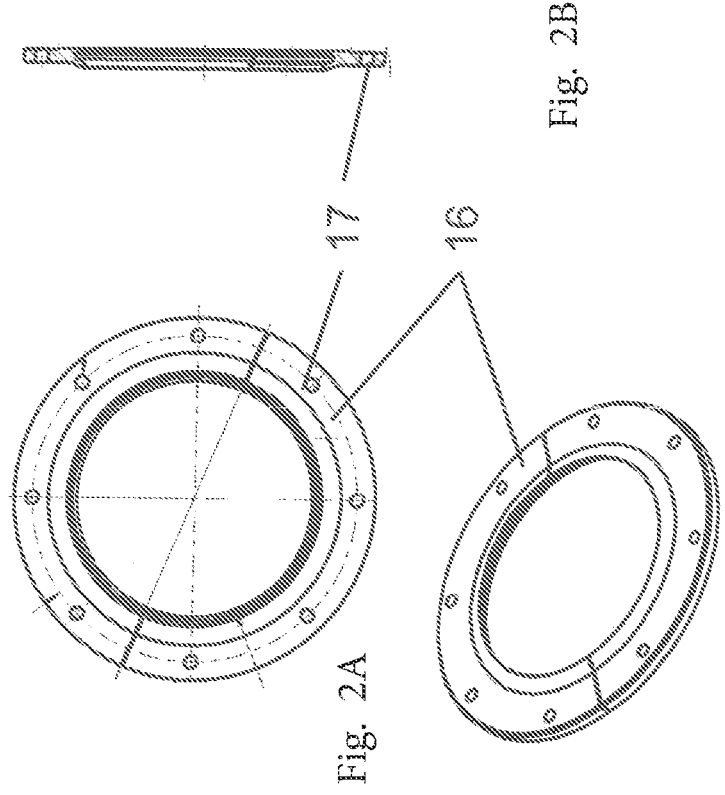
Fig. 2A  Fig. 2B
Fig. 2E

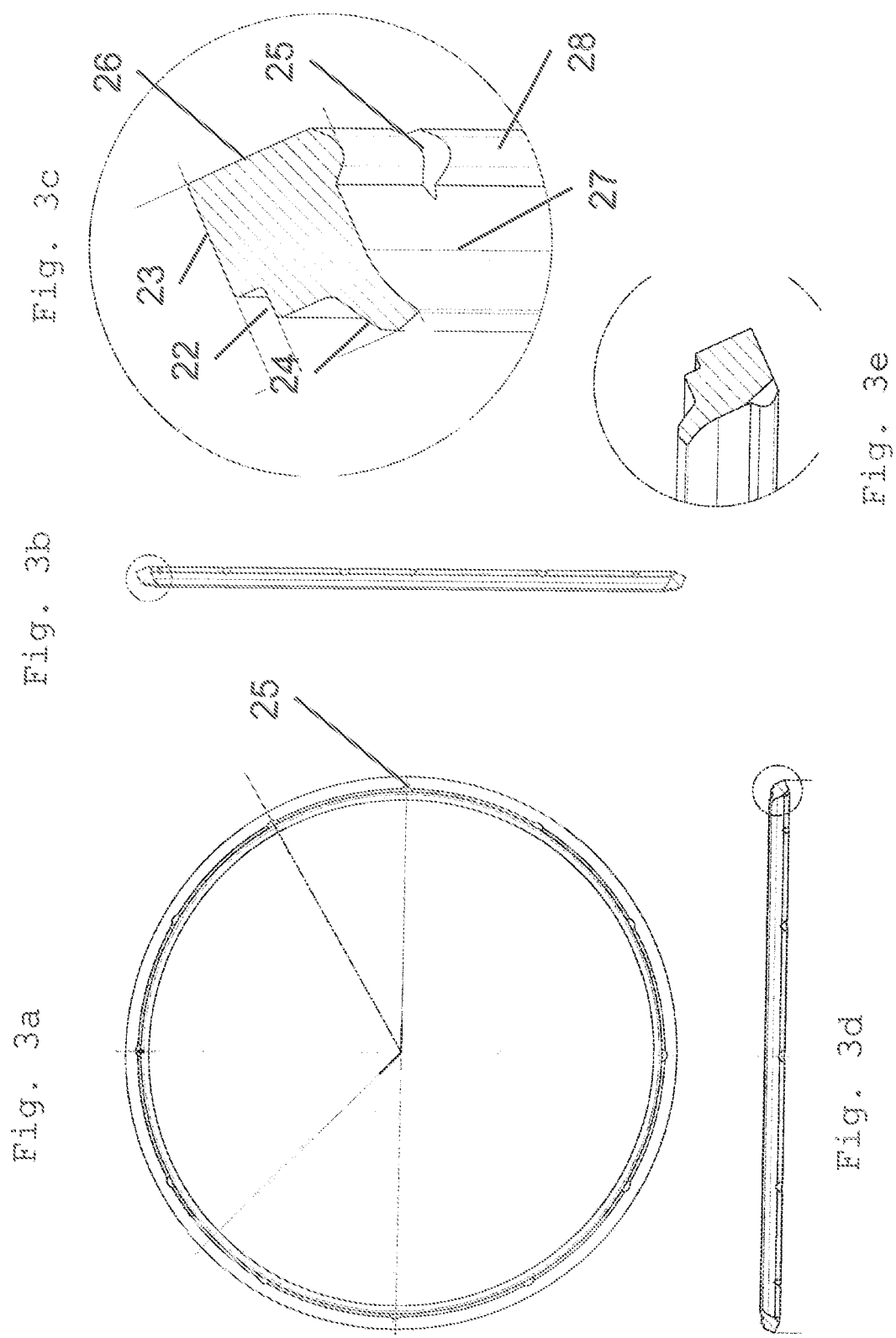

SEALING APPARATUS FOR SEALING THE BALL JOINT OF A KINGPIN

CROSS-REFERENCE TO RELATED APPLICATION

The present application is a U.S. National Phase of International Patent Application Serial No. PCT/EP2017/000386, entitled "SEALING DEVICE FOR SEALING A BALL JOINT OF A STEERING KNUCKLE PIN," filed on Mar. 29, 2017. International Patent Application Serial No. PCT/EP2017/000386 claims priority to German Patent Application No. 10 2016 003 781.4, filed on Mar. 29, 2016. The entire contents of each of the above-mentioned applications are hereby incorporated by reference for all purposes.

TECHNICAL FIELD

The invention relates to a sealing apparatus for sealing the ball joint of a kingpin comprising at least one holding ring and at least one seal ring, wherein the seal ring is provided at least partially within a groove of the holding ring, and wherein the groove is provided in a radially inwardly disposed region of the holding ring.

BACKGROUND AND SUMMARY

Ball joints are used in construction machinery for suspending or coupling steering components and have to be protected from contamination such as can in particular occur in construction site operation of the construction machine. It is known for this purpose to provide seals or covers by means of which it is possible to protect the contact region or the inner region of the ball joint in which the joint ball is supported in the joint pot or in the socket. It is disadvantageous in these seals known from the prior art that they are prone to contamination and are not very reliable and can in particular not maintain their function in the long term in intense construction site operation.

Against this background, it is the object of the invention to provide a corresponding protection to seal the ball joint that effectively prevents the penetration of dirt, avoids collections of dirt in the region of the ball joint, enables the limited escape of lubricating fluid for the purpose of a self-cleaning of the ball joint, is light, and can be simply installed.

This object is achieved in accordance with the invention by a sealing apparatus for sealing a ball joint of a kingpin comprising at least one holding ring and at least one seal ring, wherein the seal ring is provided at least partially within a groove of the holding ring; and wherein the groove is provided in a radially inwardly disposed region of the holding ring. Advantageous embodiments are the subject of the dependent claims Accordingly, a sealing apparatus is provided comprising at least one holding ring and at least one seal ring, wherein the seal ring is provided at least partially within a groove of the holding ring, and wherein the groove is provided in a radially inwardly disposed region of the holding ring. An effective scraping apparatus within a holding ring of the ball joint is thus provided instead of an outwardly disposed seal or sealing. The scraping apparatus is configured to prevent the penetration of dirt into the ball joint and simultaneously to enable a limited escape of lubricating fluid from the ball joint to the outside, whereby a washing of dirt particles out of the ball joint is effected.

An apparatus is thus advantageously provided that is lighter and smaller than protective apparatus known from the prior art and that can furthermore be installed more simply. The apparatus in accordance with the invention is furthermore supported within the holding ring so that is advantageously better protected from damage and contaminants.

It is conceivable in an advantageous embodiment that the groove comprises at least two first inner truncated cone regions that are in particular aligned in parallel with one another, with the seal ring comprising correspondingly arranged outer truncated cone regions. The truncated cone regions of the holding ring and the seal ring can each be stepped so that the holding ring and the seal ring engage in one another in a correspondingly stepped manner, whereby a better hold of the components to one another and a better sealing are made possible. As can be seen from the Figures, the radially inwardly disposed region of the holding ring comprising the groove can be located close to the radially innermost region of the holding ring.

It is conceivable in a further embodiment that the first inner truncated cone regions of the holding ring are encompassed by at least two second inner truncated cone regions that are in particular aligned in parallel with the first inner truncated cone regions and/or that the holding ring is formed in two pieces.

The second inner truncated cone regions of the holding ring here encompass the seal ring in the assembled state of the sealing apparatus at least partially in the axial direction within the holding ring or are arranged substantially in parallel with the ball surface of the ball joint and thus at least partially surround, together with the ball of the ball joint, the annular reception space for the seal ring present within the groove. The seal ring can thereby be held in position better, whereby in turn a better seal is made possible.

It is conceivable in a further preferred embodiment that the seal ring comprises a seal lip that is in particular aligned in parallel with its outer truncated cone regions. The seal lip can be in contact with the ball surface of the ball joint via a contact region and can thus achieve a sealing effect between the inner space of the ball joint and the environment. The seal lip can here also be at least partially curved and/or can be arranged at an angle to the outer truncated cone regions of the seal ring. The contact region of the seal lip can hereby be better adapted to the ball surface of the joint ball, whereby inter alia a smaller bend of the seal lip and thus its increased service life are effected.

It is conceivable in a further preferred embodiment that the truncated cone regions are arranged at an angle of 90° to 140°, in particular of 105° to 125°, and particularly preferably of 115 to ±5°, to a base region of the holding ring or to a base region of the seal ring. The seal ring or the seal lip of the sealing apparatus can hereby be placed approximately in parallel at a corresponding region of the ball of the ball joint, whereby the effectiveness of the seal can be increased.

It is conceivable in a further preferred embodiment that the holding ring can be coupled to a socket, with feed-throughs being provided in the base region of the holding ring for coupling the holding ring to the socket, and/or with an abutment, that is at least partially in the form of a cylinder jacket and/or at least partially in the form of a truncated cone, being provided at the base region of the holding ring to center the holding ring at the socket.

The invention is further directed to a seal ring having at least one truncated cone region, and in particular at least two truncated cone regions, arranged at the outside thereof for use in a sealing apparatus in accordance with one of the claims 1 to 6 and to a holding ring having at least one groove provided inwardly thereat, with the groove comprising at least one inner truncated cone region, and in particular two truncated cone regions that are aligned in parallel with one another, with the holding ring being used in a sealing apparatus in accordance with one of the claims 1 to 6.

The invention further relates to a wheel suspension for a large construction machine, in particular for a dump truck, having at least one sealing apparatus in accordance with one of the claims 1 to 6 and to a correspondingly equipped large construction machine.

BRIEF DESCRIPTION OF THE FIGURES

Further details and advantages are explained with reference to an embodiment of the invention shown by way of example in the Figures. There are shown:

FIGS. 2A-E: different views of a holding ring in accordance with the invention; and FIGS. 3A-E: different views of a seal ring in accordance with the invention.

DETAILED DESCRIPTION

Figures 1A, 1B, 1C:
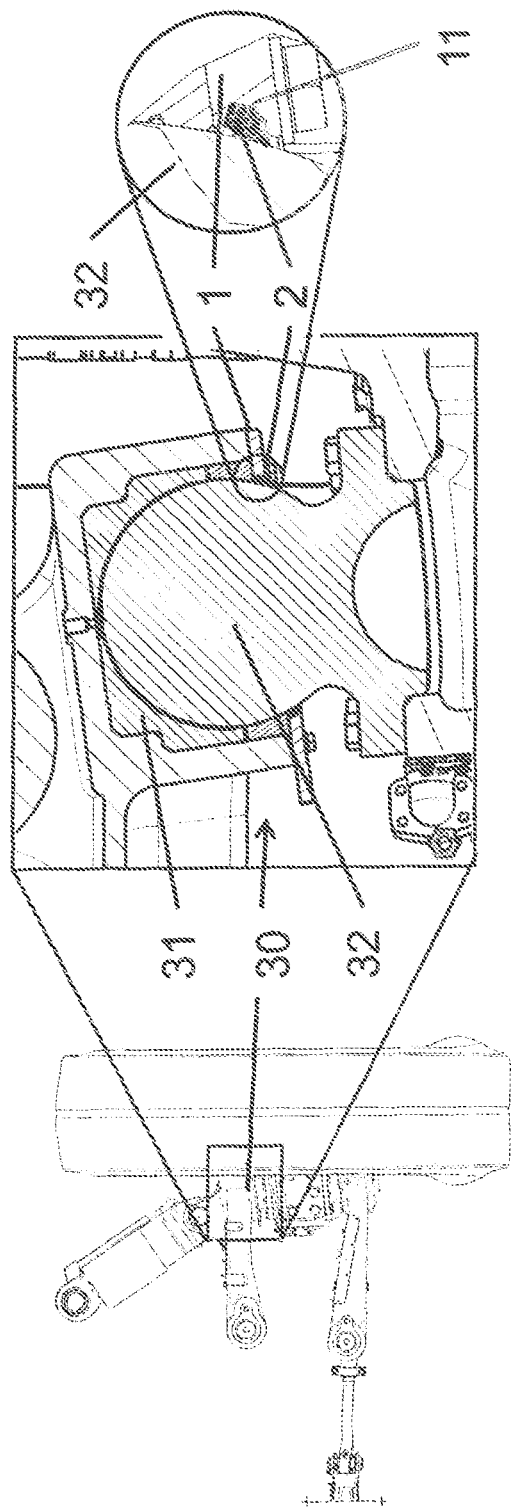
FIG. 1A: a wheel suspension with a kingpin sealed in accordance with the invention.
FIG. 1B: a sectional view of a ball joint of a wheel suspension with a kingpin sealed in accordance with the invention.
FIG. 1C: a detail view of the sealing apparatus in accordance with the invention in a sectional view.

In accordance with FIG. 1A, the wheel suspension shown therein comprises at least one ball joint 30 by means of which a wheel, for example of a construction machine, is indirectly pivotably coupled to the construction machine over a plurality of degrees of freedom. As can be seen from FIG. 1B, the holding ring 1 together with the seal ring 2 encompasses the ball 32 of the ball joint 30 in the socket 31, with the ball 32 admittedly being able to rotate, but with the inner space of the joint socket being sealed by the seal ring 2.

As can be seen from FIG. 1C, the seal ring 2 here extends within a groove 11 of the holding ring, with the groove 11 being provided in a radially inwardly disposed region of the holding ring 1. The seal lip 24 of the seal ring 2 explained in more detail in the following can be oriented toward the outside of the ball joint 30 or away from the socket 31. The interior of the ball joint 30 can here be understood as the region bounded by the socket 31 and the holding ring 1.

FIGS. 2A to 2E show different views of the holding ring 1, with FIG. 2A being a plan view of the holding ring 1 in which the holding ring 1 has a circular cross-section. FIG. 2B is a lateral sectional view of the holding ring 1, while FIGS. 2C and 2D are details of the groove 11 of the holding ring 1. FIG. 2E shows a perspective view of the holding ring 1.

The radially outwardly disposed region of the holding ring 1 forms a base region 16 of the holding ring 1. As can be seen from FIG. 2A, the holding ring 1 can be formed in two pieces and it can also be formed in multiple pieces, whereby the attachment of the holding ring 1 to the socket is made possible or is simplified. The holding ring 1 can be formed from two identical or symmetrical halves. The manufacture of the holding ring 1 can hereby be simplified since no different components have to be provided.

It is in particular possible to install the holding ring 1 after the assembly of the ball 32 in the sockets 31 with the ball socket 30. This also advantageously makes it possible to replace the holding ring 1 or the seal ring 2 without have to completely dismantle the ball joint 30.

As can be seen from FIGS. 2A and 2B, feed-throughs 17 can be provided at the holding ring 1 and can be provided at the base region 16 of the holding ring 1. The feed-throughs 17 can be provided to receive fixing means such as screws by means of which the apparatus or the holding ring 1 can be coupled to the socket 31 or to other structures of the ball joint 30. Corresponding threaded bores, feed-throughs, or similar can be provided in the socket 31 for this purpose and can be formed for fixing the fixing means. Four respective feed-throughs 17 can be provided at a half of the holding ring 1 here, for example. Furthermore, as can be seen from FIG. 2C, an abutment 18 in the form of a cylinder jacket and/or in the form of a truncated cone can be provided at the holding ring 1 to center the holding ring 1 at the socket 31.

FIGS. 2C and 2D show the two first inner truncated cone regions 12, 13 of the holding region 1 that are in particular aligned in parallel with one another and in which the matching outer truncated cone regions 22, 23 of the seal ring 2 can be arranged. The truncated cone regions 12, 13 can be part of the groove 11 of the holding ring 1. The individual truncated cone regions 12, 13, 22, 23 can be connected via walls arranged perpendicular and/or angled to the truncated cone regions 12, 13, 22, 23. Second inner truncated cone regions 14, 15 that are in particular arranged in parallel are furthermore provided outside the first truncated cone regions 12, 13 of the holding ring 1 and can likewise be coupled to the further truncated cone regions 12, 13 via walls arranged perpendicular thereto and/or angled thereat.

FIGS. 2D and 3C show that the truncated cone regions 12, 13, 14, 15, 22, 23 are arranged at angles to base regions 16, 26 of the holding ring 1 and the seal ring 2. The seal ring 2 can thereby be arranged in parallel or substantially in parallel at a section of the ball 32 of the ball joint 30. The base region 16 of the holding ring 1 can here be formed as a hollow-cylindrical ring section.

FIGS. 3A to 3E show a seal ring 2 having a seal lip 24 that can be clearly recognized in FIGS. 3C and 3E. The seal ring 2 has at least partially a geometry negative with respect to the holding ring 1 so that the seal ring 2 can be placed or positioned at the correspondingly shaped groove 11 of the holding ring 1 and can be brought into engagement with the holding ring 1 with force transmission or shape matching.

The base region 26 of the seal ring 2 can be that region that faces the inner side of the ball joint 30 in the installed state of the sealing apparatus. The truncated cone regions 22, 23 of the seal ring 2 can here in particular be arranged at right angles to the base region 26.

Recesses 25 are shown in FIGS. 3A to 3D that can be arranged distributed in the peripheral direction of the seal ring 2. They can enable a limited escape of a lubricating substance from the inner space of the ball joint to the outside. A formation 28 in which the recesses 25 extend at least in part can be provided at a region of the seal ring 2 spaced apart from the seal lip 24. The seal lip 24 and the formation 28 can be configured such that they are in contact with the ball 32 of the ball joint 30 in the installed state of the sealing apparatus.

A region 27 can be provided between the seal lip 24 and the formation 28 and is not in contact with the ball 32 of the ball joint 30 in the installed state of the sealing apparatus. This region 27 of the seal ring 2 can be concave. It is hereby made more simple to connect the seal lip 24 elastically or movably to the remaining structure of the seal ring 2 such that the seal lip 24 is pressed toward the outside or away from the ball 32 in the installed state of the sealing apparatus, whereby the seal lip 24 is pressed onto the ball 32 due to its elasticity and a sealing effect is thus achieved.

The seal ring 2 can be produced from an elastic plastic while the holding ring 1 can be produced from a metal. Embodiments are also conceivable in which both components are produced from plastic and/or in one piece. It can, however, be necessary here that the ball 32 of the ball joint 30 is held by another type of holding apparatus within the socket 31.

The invention claimed is:

1. An apparatus for sealing a ball joint of a kingpin, comprising:
    a socket formed by a wall forming a first circumference around a recess for receiving the ball joint, the wall extending in the direction of a center axis of the recess;
    at least one holding ring formed in two pieces and extending from the first circumference toward the center axis of the recess, and a holding ring end face positioned at a second circumference radially inward from the first circumference;
    a groove extending in a circumference around the holding ring end face; and
    at least one seal ring for contacting a surface of the ball, the at least one seal ring having at least one truncated cone region arranged thereat, and the at least one seal ring positioned at least partially within the groove.

2. The apparatus in accordance with claim 1, wherein the holding ring comprises at least two first inner truncated cone regions that are aligned in parallel with one another, with the at least one truncated cone region of the seal ring comprising correspondingly arranged outer truncated cone regions.

3. The apparatus in accordance with claim 2, wherein the first inner truncated cone regions of the holding ring are encompassed by at least two second inner truncated cone regions that are aligned in parallel with the first inner truncated cone regions.

4. The apparatus in accordance with claim 3, wherein the first and second inner truncated cone regions and outer truncated cone regions are arranged at an angle of 90°-140° to a base region of the holding ring or to a base region of the seal ring.

5. The apparatus in accordance with claim 4, wherein the holding ring is coupleable to the socket, with feed-throughs being provided in the base region of the holding ring to couple the holding ring to the socket; and/or with an abutment being provided at the base region of the holding ring that is at least partially in cylinder jacket form and/or at least partially in truncated cone form, to center the holding ring at the socket.

6. The apparatus in accordance with claim 4, wherein the first and second inner truncated cone regions and outer truncated cone regions are arranged at an angle of 105°-125° to the base region of the holding ring or to the base region of the seal ring.

7. The apparatus in accordance with claim 4, wherein the first and second inner truncated cone regions and outer truncated cone regions are arranged at an angle 115°±5° to the base region of the holding ring or to the base region of the seal ring.

8. The apparatus in accordance with claim 3, wherein the seal ring comprises a seal lip that extends in a circumference aligned in parallel with a circumferences of the outer truncated cone regions.

9. The apparatus in accordance with claim 2, wherein the seal ring comprises a seal lip that is coaxial with its outer truncated cone regions.

10. The apparatus in accordance with claim 9, wherein the inner and outer truncated cone regions are arranged at an angle of 90°-140° to a base region of the holding ring or to a base region of the seal ring.

11. An apparatus for sealing a ball joint of a kingpin, the apparatus comprising:
    a socket formed by a wall forming a first circumference around a central axis of a recess for receiving a ball of the ball joint along the central axis;
    at least one holding ring extending from the first circumference toward the central axis of the recess, a holding ring end face at a second circumference radially inward from the first circumference, and the holding ring end face oriented facing the central axis of the recess;
    a groove extending in a circumference around the holding ring end face; and
    a seal ring having at least one truncated cone region arranged thereat, the seal ring for contacting a surface of the ball, and the seal ring positioned at least partially within the groove.

12. The apparatus in accordance with claim 11, wherein the seal ring has two truncated cone regions.

13. The apparatus in accordance with claim 11, wherein the holding ring end face is oriented at an angle relative to the central axis of the recess, the angle for corresponding to the curvature of the surface of the ball contacting the sealing ring in the installed position.

14. A wheel suspension for a large construction machine having at least one apparatus for sealing a ball joint of a kingpin, the apparatus comprising:
    a socket formed by a wall forming a first circumference around a recess for receiving the ball joint, the wall extending in the direction of a center axis of the recess;
    at least one holding ring connected to an end face of the wall of the socket at the first circumference, the holding ring extending from the first circumference toward the center axis of the recess, and a holding ring end face at a second circumference radially inward from the first circumference;
    a groove extending in a circumference around the holding ring end face;
    and at least one seal ring for contacting a surface of the ball, the at least one seal ring having at least one truncated cone region arranged thereat, and the at least one seal positioned at least partially within the groove.

* * * * *